(12) United States Patent
Nishimura

(10) Patent No.: US 9,990,695 B2
(45) Date of Patent: Jun. 5, 2018

(54) EDGE SENSING MEASURE FOR RAW IMAGE PROCESSING

(71) Applicant: Intel Corporation, Santa Clara, CA (US)

(72) Inventor: Jun Nishimura, Yokohama (JP)

(73) Assignee: INTEL CORPORATION, Santa Clara, CA (US)

( * ) Notice: Subject to any disclaimer, the term of this patent is extended or adjusted under 35 U.S.C. 154(b) by 164 days.

(21) Appl. No.: 14/671,453

(22) Filed: Mar. 27, 2015

(65) Prior Publication Data

US 2016/0284053 A1 Sep. 29, 2016

(51) Int. Cl.
| | | |
|---|---|---|
| H04N 3/14 | (2006.01) | |
| H04N 5/228 | (2006.01) | |
| H03L 7/00 | (2006.01) | |
| G06T 3/40 | (2006.01) | |
| G06T 11/00 | (2006.01) | |

(52) U.S. Cl.
CPC .......... G06T 3/4015 (2013.01); G06T 11/001 (2013.01)

(58) Field of Classification Search
CPC ............. H04N 5/367; H04N 2209/046; H04N 2209/045; G06T 3/4015; G06T 3/4007; G06T 11/60; G06T 5/20; G06T 3/40; H01L 27/14621
USPC .................................. 348/273, 246; 356/419
See application file for complete search history.

(56) References Cited

U.S. PATENT DOCUMENTS 5,373,322 A * 12/1994 Laroche ................ G06T 3/4007
348/272

| 7,652,700 | B2* | 1/2010 | Takahashi | G06T 3/4015 |
| | | | | 348/222.1 |
| 2003/0193590 | A1* | 10/2003 | Hirai | H04N 5/335 |
| | | | | 348/294 |
| 2004/0218073 | A1* | 11/2004 | Kalevo | H04N 9/045 |
| | | | | 348/272 |
| 2006/0115184 | A1* | 6/2006 | Michel | G06T 3/403 |
| | | | | 382/299 |

(Continued)

OTHER PUBLICATIONS

Notification of Transmittal of the International Search Report and the Written Opinion of the International Searching Authority issued for International Patent Application No. PCT/US2016/018093, dated Jun. 3, 2016.

(Continued)

*Primary Examiner* — Xi Wang

(74) *Attorney, Agent, or Firm* — Womble Bond Dickinson (US) LLP

(57) ABSTRACT

A method, apparatus and system for performing a demosaic operation are described. In one embodiment, the apparatus comprises: a plurality of interpolation modules to perform a plurality of interpolation operations to generate color pixel values of a first color for a plurality of pixel locations in an image region that do not have color pixel values of the first color; a first module to generate a set of color pixel values of the first color for the image region, one or more color pixel values in the set of pixel values being generated based on color pixel values of the first color from one of the plurality of interpolation modules; and a second module to select the one interpolation module based on an interpolation direction determined by color intensity gradient calculations that involve pixel values of the first color and at least one other color.

20 Claims, 7 Drawing Sheets

(56) References Cited

U.S. PATENT DOCUMENTS

| | | | |
|---|---|---|---|
| 2007/0035637 A1* | 2/2007 | Feng | G06T 3/4015 |
| | | | 348/223.1 |
| 2009/0097743 A1 | 4/2009 | Quan | |
| 2011/0069192 A1* | 3/2011 | Sasaki | H04N 9/045 |
| | | | 348/222.1 |
| 2011/0273593 A1 | 11/2011 | Cohen et al. | |
| 2012/0105691 A1 | 5/2012 | Waqas et al. | |
| 2012/0230601 A1 | 9/2012 | Iso et al. | |
| 2013/0077862 A1* | 3/2013 | Nomura | H04N 9/045 |
| | | | 382/167 |
| 2014/0348425 A1* | 11/2014 | Tian | G06T 3/0093 |
| | | | 382/167 |
| 2016/0267628 A1* | 9/2016 | Yang | G06T 3/4007 |

OTHER PUBLICATIONS

Baek, Mingyu, et al., "Demosaicing Algorithm using High-order Interpolation with Sobel Operators", Proceedings of the World Congress on Engineering and Computer Science 2014, Oct. 22-24, 2014, San Francisco, California, 4 pages.

Chung, Kuo-Liang, et al., "Demosaicing of Color Filter Array Captured Images Using Gradient Edge Detection Masks and Adaptive Heterogeneity-Projection", IEEE Transactions on Image Processing, vol. 17, No. 12, Dec. 2008, pp. 2356-2367.

PCT Appln. No. US2016/018093 International Preliminary Report, dated Oct. 12, 2017, 9 pgs.

\* cited by examiner

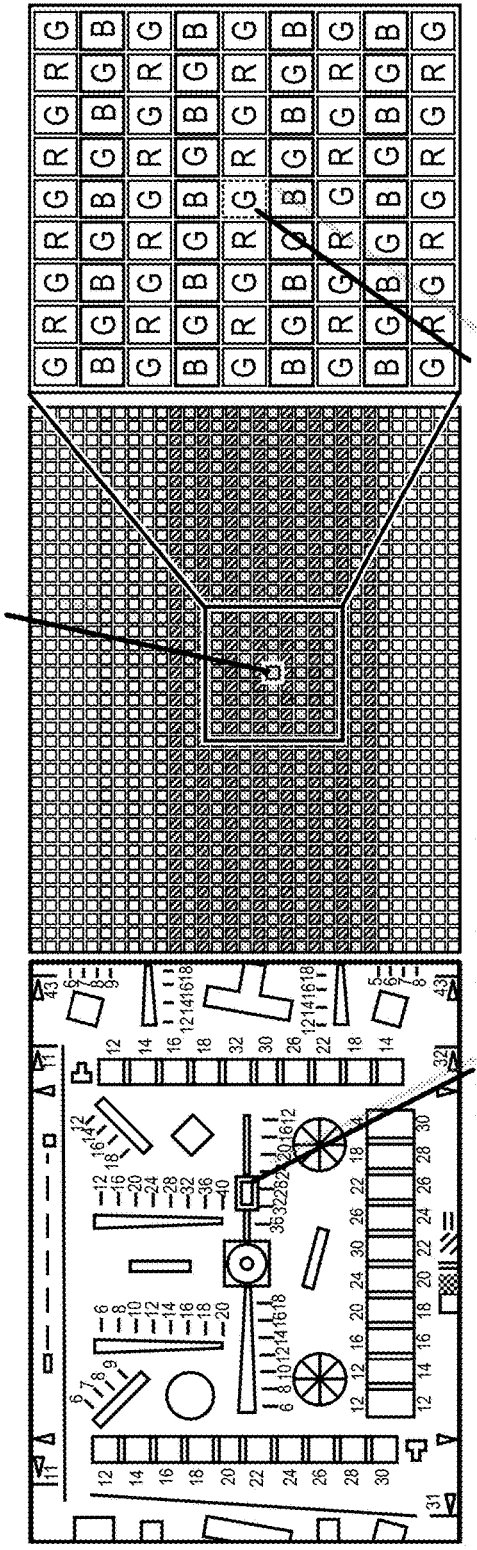
Figure 4(A) RESOLUTION CHART
Figure 4(B) CLOSE UP AT HIGH FREQUENCY
Figure 4(C) INPUT RAW IMAGE IN LEFT ROI
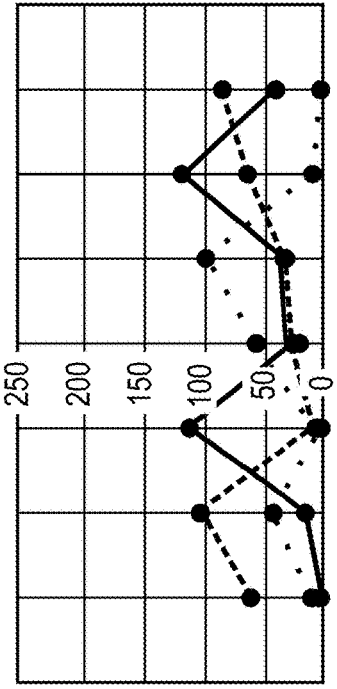
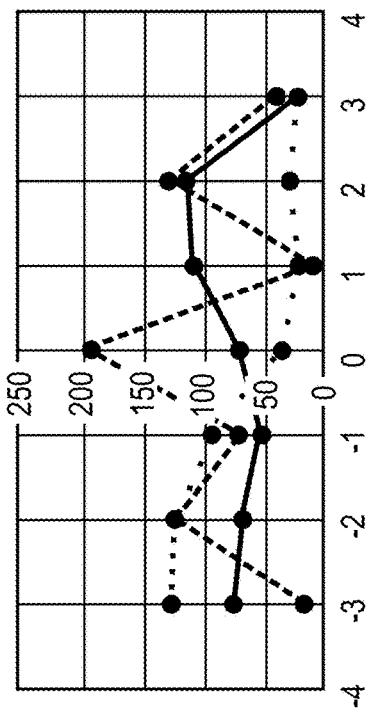
Figure 5

EDGE SENSING MEASURE FOR RAW IMAGE PROCESSING

FIELD OF THE INVENTION

Embodiments of the present invention relate to the field of color image processing; more particularly, embodiments of the present invention relate to image demosaicing using an integrated gradient based on inter-color intensity.

BACKGROUND OF THE INVENTION

Many color cameras capture images use a color filter array over an image sensor to sample only one of the primary colors (red (R), green (G), blue (B)) at each pixel position. More specifically, the color filter array filters the incoming light so that each pixel of the image sensor receives only one of the primary colors. A commonly used color filter array is referred to as a Bayer pattern color filter array, which is described in U.S. Pat. No. 3,971,065.

Typically, the Bayer pattern color filter array selectively passes pixels to the image sensor so that a mosaic is produced with one-half of its pixels being green, one-quarter of its pixels being red, and one-quarter of its pixels being blue. That is, the captured green pixels G are only one-half of the total number of pixels captured by the image capture sensor, and the captured red pixels and blue pixels are each only one-quarter of the total number of pixels captured by the image capture sensor.

To obtain a complete full resolution set of pixels for each of the color components, a process referred to as demosaicing is used to reconstruct a full color image from the color samples that are output from an image capture sensor overlaid with a color filter array. Part of the demosaicing process usually requires interpolating the color image data. The interpolation process often uses an interpolation direction estimate to avoid any artifacts that result in a low image quality. The interpolation direction estimate may be determined using gradient information extracted from cross color intensity domains. Many of the conventional methods use an integrated gradient that extracts gradient information from either color intensity or color difference domains. In most cases, they resulted in fine direction estimate, but they fails at high frequency regions of the image, resulting in zipper, maze, and false color artifacts. If the interpolation direction is not accurate, resolution is degraded by wrong edge at the high frequency region.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 4A-4C illustrate an example high frequency region in resolution chart.

FIG. 5 illustrates gradient in Color Intensity Domain.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

A demosaicing process and apparatus are described. The techniques described herein improve the accuracy of an interpolation direction estimate used in the demosaicing process. Use of these techniques results in the image free of maze/checker/zipper artifacts, which are common issues in the conventional demosaic algorithms.

In one embodiment, the demosaicing process described herein generates full resolution sets of red, green, and blue pixels from the partial sets of red, green, and blue pixels captured by an image capture sensor with a color filter array. The image capture sensor captures a monochromatic image. Each captured pixel is assigned an appropriate color and processed as a pixel of that color.

In one embodiment, the demosaicing process is performed with an image capture unit that includes a Bayer pattern color filter array and an image capture sensor. Note that use of a Bayer color filter array is not required, and other color filter arrays may be used. In one embodiment, the demosaicing process includes two reconstruction processes to create a full resolution set of pixels for an image region (e.g., a 3×3 region, 5×5 region, 7×7 region, a frame, etc.). First, for an image region resulting from a color filter array (e.g., Bayer pattern color filter array), the missing green pixels of the image region are reconstructed using interpolation. In one embodiment, the missing green pixels of the image region are reconstructed using interpolation and blending. Second, red and blue pixels are constructed using the green pixels, both original pixel values output from the color filter array and pixel values reconstructed using interpolation.

Figure 1:
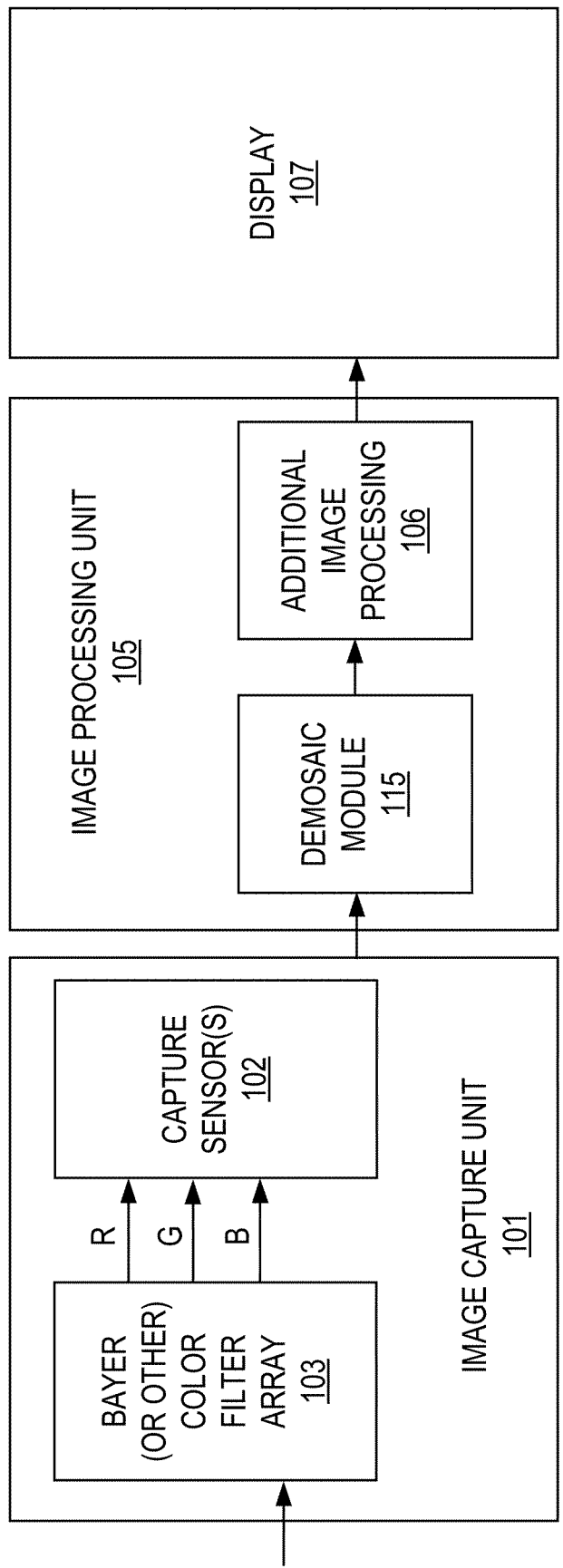
FIG. 1 is a block diagram of one embodiment of a system for specifying color image processing.
Figures 2, 3:
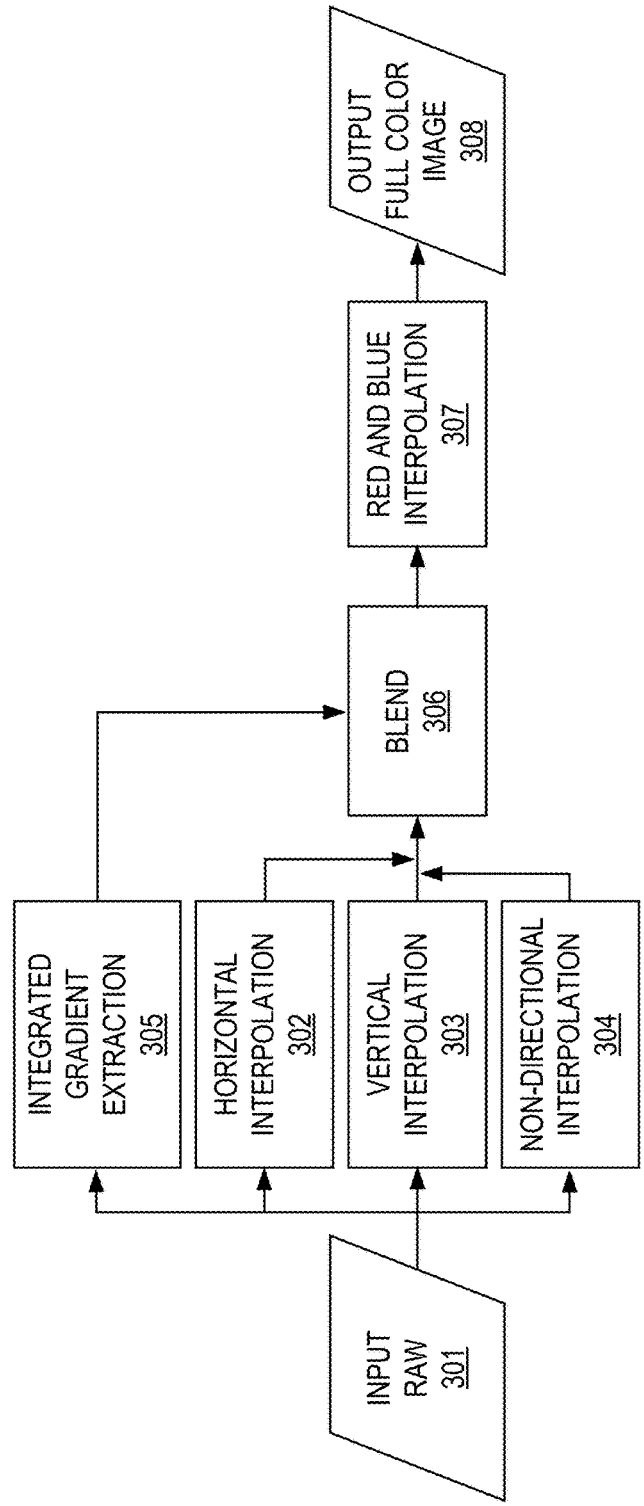
FIG. 2 illustrates a Bayer pattern.
FIG. 3 is a flow diagram of a demosaicing process.

FIG. 1 illustrates a block diagram of an image capture system. Referring to FIG. 1, image capture system 100 includes an image capture unit 101 that includes a single-chip image capture sensor 102 with a Bayer color filter array 103. Bayer color filter arrays 103 has a pixel layout such as shown in FIG. 2. In one embodiment, image capture unit 101 captures a frame of pixels. In another embodiment, image capture unit 101 captures less than a frame of pixels.

A controller 104 controls frame capture and the transfer of captured frames to image processing system 105. Image processing system 105 performs a variety of techniques to improve the quality of the images that are sent to display unit 107. Demosaic module 115 perform demosaicing on image data captured by image capture unit 101. Image processing system 105 includes a demosaic module 115 and additional image processing system 106. Optional image processing module 106 receives processed images from demosaic module 115 prior to display on display unit 107.

FIG. 3 is a data flow diagram of one embodiment of processing performed by a demosaic module. The process is performed by processing logic that may comprise hardware (circuitry, dedicated logic, etc.), software (such as is run on a general purpose computer system or a dedicated machine), firmware, or a combination of these three. In one embodiment, the processing of FIG. 3 is performed by demosaic module 115 of FIG. 1.

Referring to FIG. 3, the process begins by receiving raw image input data 301. In one embodiment, the raw image input data is a frame of pixels from image capture unit 102. The pixels in the received frame have the pixel layout of a frame shown in FIG. 2 due to Bayer color filter array 103.

Using the received raw image input data 301, the demosaic processing (e.g., demosaic module 115) initially reconstructs missing green pixels so that all locations in image data 301 have a green pixel value. In FIG. 2, green pixels (pixels with green pixel values) that were captured by image capture sensor 101 are represented by the letter "G" (while red pixels are represented by the letter "R" and blue pixels are represented by the letter "B"). Pixel values for those missing green pixels are generated by applying interpolation to the green pixels values that already exist for the image region. In one embodiment, multiple interpolated values for the missing green pixels are generated using multiple types of interpolation applied by multiple interpolation modules.

Horizontal interpolation module 302 applies a horizontal interpolation operation to generate a pixel value for each missing green pixel location in raw image input 301. In one embodiment, horizontal interpolation module 302 performs a horizontal interpolation operation to generate a green pixel value for each missing green pixel by interpolating the two green pixel values of green pixels adjacently located on the left and right sides of the missing green pixel.

Vertical interpolation module 303 applies a vertical interpolation operation to generate a pixel value for each missing green pixel location in raw image input 301. In one embodiment, vertical interpolation module 303 performs a vertical interpolation operation to generate a green pixel value for each missing green pixel by interpolating two green pixel values of green pixels adjacently located above and below of the location the missing green pixel.

Non-directional interpolation module 304 applies a non-directional interpolation operation to generate a pixel value for each missing green pixel location of raw image input 301. In one embodiment, non-directional interpolation module 304 averages all the green pixels in the image region (e.g., raw image input 301) to create estimated green pixel values that are used for all missing green pixels in the region. For example, if a 3×3 region has four green pixels, green pixel values for the missing green pixels can be estimated using an average of the values of the four green pixels.

Blend module 306 blends pixel values output from horizontal interpolation module 302, vertical interpolation module 303 and non-directional interpolation module 304. The blending performed by blend module 306 is based on one or more control inputs (e.g., signals) from integrated gradient extraction module 305. That is, integrated gradient extraction module 305 controls which of horizontal interpolation module 302, vertical interpolation module 303 and non-directional interpolation module 304 is supplying interpolated pixel values that are sent to blend module 306 to undergo blending.

Note that, in one embodiment, values from the non-interpolated green pixels (those that were output from the color filter array) are used in the blend module depending on the operation used inside horizontal/vertical/non-directional interpolation blocks. In one embodiment, a weighted averaged version of interpolated and non-interpolated the green (G) pixel values is used to avoid artifacts. For example, assuming a 3×3 array as follows:

```
G R G
B G B
G R G
```

At the middle position G, a green pixel value already exists, but in one embodiment the value of the center G pixel is mixed (or averaged) with the average of the values of the surrounding four G pixels.

In one embodiment, a similar operation is performed for values of horizontal or vertical pixels. For example, assuming the following

G R G R G

The center G is mixed (or averaged) with the average of the values of the two G pixels.

Thus, these can be described as interpolated results. If a mixing ratio is set to 0 (or 1) is used, in one embodiment, a simple average of the values of 3 G pixels is used.

Figure 10:
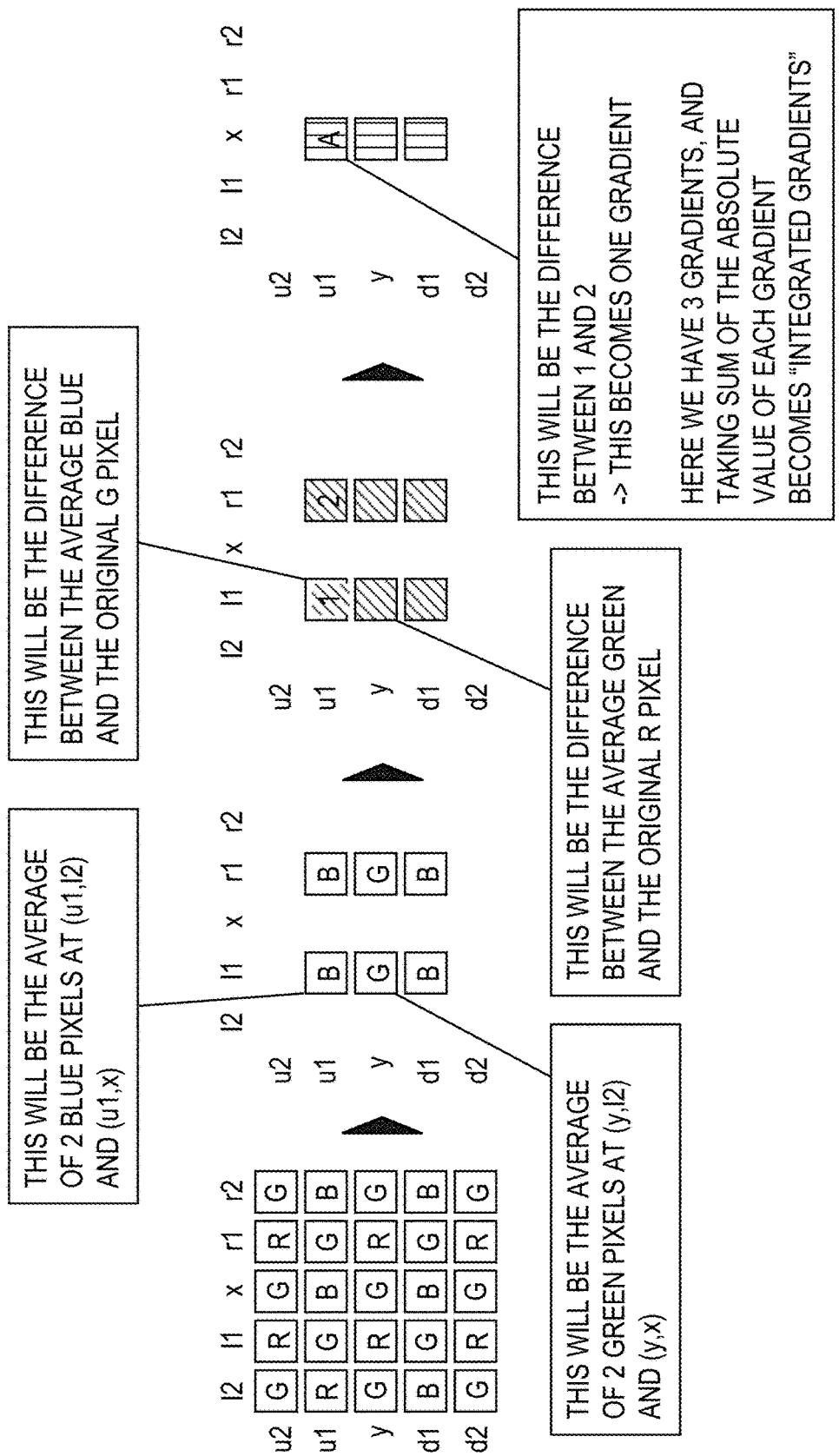
FIG. 10 illustrates one embodiment of a color difference domain gradient.

In one embodiment, integrated gradient extraction module 305 determines which of horizontal interpolation module 302, vertical interpolation module 303 and non-directional interpolation module 304 supplies pixel values based on an interpolation direction. In one embodiment, integrated gradient extraction module 305 determines the interpolation direction based on calculation of one or more metrics. In other words, integrated gradient extraction module 305 a metric(s) used to estimate an appropriate interpolation direction to use in controlling the blending performed by blend module 306. The integrated gradient is the local accumulation of gradient in a different domain. In one embodiment, when calculating a value of the "integrated gradient" for a 5×5 image region, the sum of the gradients calculated from this 5×5 region is taken. This is shown in FIG. 10. Integrated gradient extraction module 305 generates control inputs for blend module 306 based on raw image input 301.

In one embodiment, integrated gradient extraction module 305 performs a calculation to determine a horizontal gradient score and a vertical gradient score. Based on a comparison of the scores, which is indicative of the interpolation direction, integrated gradient extraction module 305 determines how a missing color pixel value should be computed. That computation, in one embodiment, is based, at least in part, on a value interpolated horizontally or vertically. In general, the interpolation direction is chosen to interpolate along edges rather than across edges.

In one embodiment, in contrast to the state-of-arts methods of color-intensity (CI) and color difference (CD) domains which are well-known in the art, embodiments of the present invention use inter-color intensity for integrated gradient extraction module 305. Each of these will be discussed below to more clearly set forth below for clarification purposes.

The color intensity domain gradient is simply the gradient within each color channel. The use of this measure assumes that the intensity of this gradient will be smaller in the direction of edge. The color intensity gradient in horizontal and vertical can be written as $$\delta_{CI}^H(y, x) = \sum_{(i,j)\in\Omega} w_{CI}(i, j)|Z(y+i, x+j-1) - Z(y+i, x+j+1)|$$

$$\delta_{CI}^V(y, x) = \sum_{(i,j)\in\Omega} w_{CI}(i, j)|Z(y+i-1, x+j) - Z(y+i+1, x+j)|$$

where (y,x) are the vertical and horizontal coordinates in the image region (e.g., kernel, where (0,0) in kernel $\Omega$ is the center of kernel Ω); Z(y,x) refers to input raw image at (y,x) (which is the center pixel in FIG. 2); $w_{Cf}(i,j)$ as weight function within a certain kernel and in one embodiment, ranges from [0.0, 1.0], and can be set as a Gaussian function); Ω is a pre-defined kernel in consideration for this metric (e.g., the image region used to calculate the gradient), e.g. 5×5 image with respect to (y,x) like FIG. 2.

The color difference domain gradient metric assumes that the color difference is smooth along the edge. Thus, the comparison of horizontal and vertical color difference gradient will give the interpolation direction. The color difference (chroma) gradient in horizontal and vertical can be written as $$\delta_{CD}^H(y, x) = \sum_{(i,j) \in \Omega} \sum_{n=1} \left| \frac{(Z(y+i, x+j+n) - Z(y+i, x+j-n))}{N_n} - \frac{Z(y+i, x+j+n+1) - Z(y+i, x+j-n-1)}{M_n} \right|$$

$$\delta_{CD}^V(y, x) = \sum_{(i,j) \in \Omega} \sum_{n=1} \left| \frac{(Z(y+i+n, x+j) - Z(y+i-n, x+j))}{N_n} - \frac{Z(y+i+n+1, x+j) - Z(y+i-n-1, x+j)}{M_n} \right|$$

where $1/N_n$, $1/M_n$ ranges from [0.0, 1.0], configured to accommodate different weight to the gradient calculated at different spatial position within the kernel Ω; and n is the spatial position index, with a maximum value that depends on the size of the kernel Ω.

Then, these gradients of 2 domain types are accumulated with certain weight to give a metric for determining the interpolation direction and each reliability.

$$\delta^H(y,x) = \alpha \cdot \delta_{CD}^H(y,x) + (1-\alpha) \cdot \delta_{CI}^H(y,x)$$

$$\delta^V(y,x) = \alpha \cdot \delta_{CD}^V(y,x) + (1-\alpha) \cdot \delta_{CI}^V(y,x)$$

For example, if $f(\delta^H(y,x), \delta^V(y,x), \sigma) > 0$, the interpolation directions is determined to be horizontal, while if $f(\delta^H(y,x), \delta^V(y,x), \sigma) < 0$, then the interpolation directions is determined to be vertical.

Figure 6:
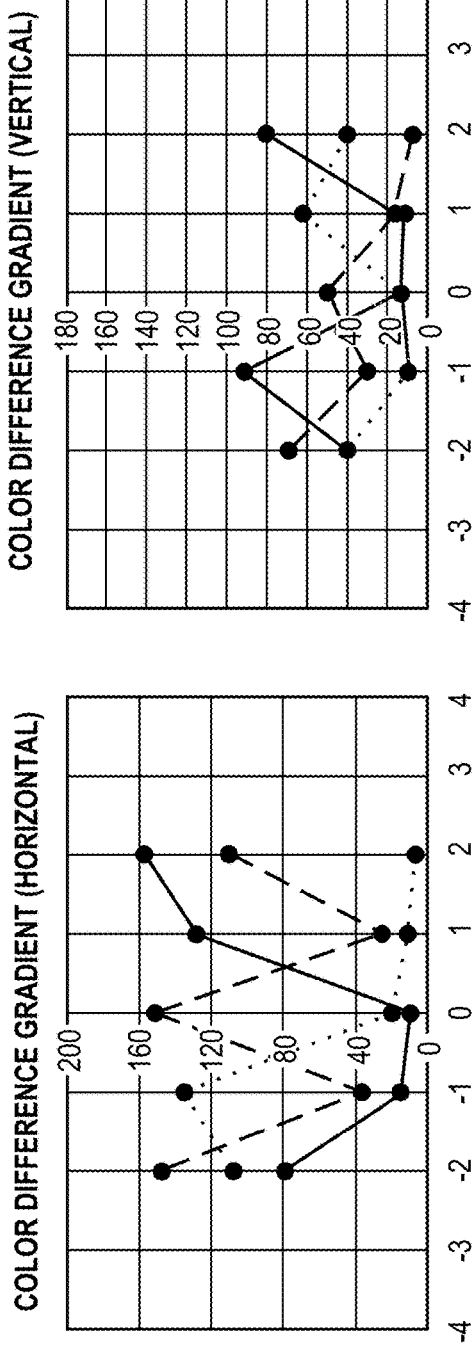
FIG. 6 illustrates gradient in Color Difference Domain.

In the high frequency region, these two well-known domains for integrated gradient extraction often fail. FIGS. 5 and 6 are the gradients in each domain at the high frequency region of interest (ROI) centered at highlighted pixel in FIGS. 4A-4C (where the x axis represents the x coordinate, lines 501-503 indicate −1, 0, +1 offsets from the center, respectively, and where the y axis represents gradient values at each position). By looking closely, gradients in these domains result in a higher value for horizontal gradients than vertical gradients. This means they fail to distinguish the horizontal and vertical edges correctly. As a result, the output image has wrongly selected vertical edges at the horizontal regions. This is a root cause of the typically difficult image quality issues in using the demosaic algorithm.

To overcome this issue, in one embodiment, integrated gradient extraction module 305 uses an inter-color intensity domain for gradient calculation using the following equations:

$$\delta_{ICI}^H(y, x) := \sum_{(i,j) \in \Omega} \sum_{n=0} \left| \frac{(Z(y+i, x+j-n) + Z(y+i, x+j+n))}{N_n} - \frac{Z(y+i, x+j-n-1) + Z(y+i, x+j+n+1)}{M_n} \right|$$

-continued $$\delta_{ICI}^V(y, x) = \sum_{(i,j) \in \Omega} \sum_{n=0} \left| \frac{(Z(y+i-n, x+j) + Z(y+i+n, x+j))}{N_n} - \frac{Z(y+i-n-1, x+j) + Z(y+i+n+1, x+j)}{M_n} \right|$$

where normalization factors $1/N_n$, $1/M_n$ range from [0.0, 1.0] in one embodiment, and are configured to accommodate different weight to the gradient calculated at different spatial positions within the kernel Ω; and n is the spatial position index, with a maximum value that depends on the size of kernel Ω. In on embodiment, N and M are chosen by the demosaic module designer based on, for example, the location of the gradients calculated with respect to the center pixel of the kernel. Note that higher values for the normalization factor may be used to weight them lower.

The inter-color intensity domain gradient treats all input as they are part of the color channels in which the color different between adjacent pixels is made (instead of restricting the calculation to the same color channels). In other words, the color intensity gradient calculations involve pixel values of green pixels and at least one other color (red pixels, blue pixels). In one embodiment, the different weights include higher weights for pixels closer to the center and lower weights for pixels away from the center.

Figure 9:
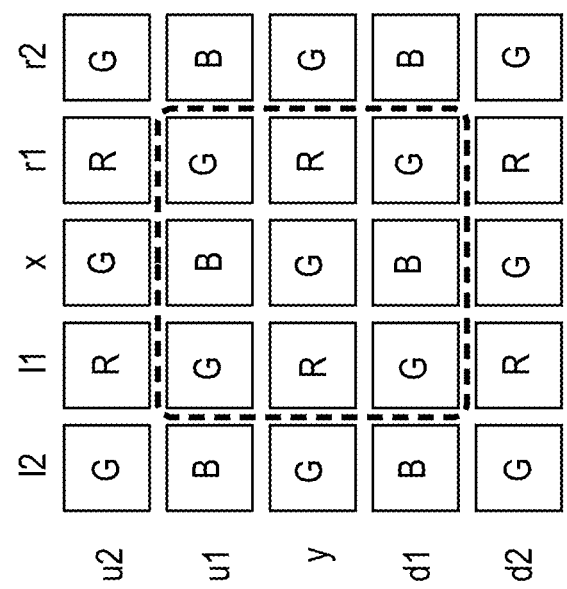
FIG. 9 illustrates an example of pixels of a Bayer pattern that are used in inter-color intensity calculations.

FIG. 9 illustrates an example of Bayer pattern with a 3×3 block of pixels highlighted in the Bayer pattern shown in FIG. 2. Applying the above formula above for the horizontal gradient score (value) with n equals 0, Ω: 3×3, and $N_n$ & $M_n$ equal 2:

$$\delta_{ICI}^H(y, x) := |Z(u1, l1) - (Z(u1, l2) + Z(u1, x))/2| +$$
$$|Z(u1, x) - (Z(u1, l1) + Z(u1, r1))/2| +$$
$$|Z(u1, r1) - (Z(u1, x) + Z(u1, r2))/2| +$$
$$|Z(y, l1) - (Z(y, l2) + Z(y, x))/2| + |Z(y, r1) - (Z(y, x) + Z(y, r2))/2| +$$
$$|Z(d1, l1) - (Z(d1, l2) + Z(d1, x))/2| +$$
$$|Z(d1, x) - (Z(d1, l1) + Z(d1, r1))/2| +$$
$$|Z(d1, r1) - (Z(d1, x) + Z(d1, r2))/2|$$

Thus, the selection of a missing pixel value (e.g., a missing green pixel value for a red pixel or blue pixel in the image kernel) from either of the horizontal interpolation module 302 (a pixel value generated in the horizontal direction) or the vertical interpolation module 303 (a pixel value generated in the vertical direction) for blending with a value from non-directional interpolation module 304 is based on gradient scores. The horizontal and vertical gradient scores are compared to determine an interpolation direction. In one embodiment, a missing color pixel value is interpolated in the direction having a lower gradient score. For example, if the horizontal gradient score is lower than the vertical gradient score, then the missing color pixel value would be interpolated horizontally, and thus the pixel value from horizontal interpolation module 302 would be used in the blending by blend module 306.

Once the interpolation direction for a pixel has been determined, the missing green pixel value associated with that pixel can be computed. Based on the interpolation direction, blend module 306 performs its blending operation.

In one embodiment, how the non-directional interpolated pixels are blended with the horizontally interpolated pixels and how the non-directional interpolated pixels are blended with the vertically interpolated pixels is as follows. For example, one can calculate the weight for a directional component as $$\text{Weight}_{dir} = \text{MAX}(\delta^H(y,x), \delta^V(y,x))/[\delta^H(y,x)+\delta^V(y,x)]$$

Then, if $\delta^H(y,x)$ is lower than $\delta^V(y,x)$+margin, One can blend the horizontal component with the non-directional component like Output=$I_H$*Weight$_{dir}$+$I_N$*(1−Weight$_{dir}$), where $I_H$ is the horizontal component and $I_N$ is the non-directional component.

On the other hand, if $\delta^V(y,x)$ is lower than $\delta^H(y,x)$+margin, then one can blend with the vertical and non-directional components.

$$\text{Output} = I_V \text{*Weight}_{dir} + I_N \text{*}(1-\text{Weight}_{dir}),$$

where $I_V$ is the vertical component. Otherwise, the Output is $I_N$

After blending has been completed once the green channel has been interpolated (i.e., once missing green values have been estimated), each location in the frame has either a green pixel G or a reconstructed green pixel g. Thereafter, red and blue interpolation module 307 reconstructs each missing blue pixel and each missing red pixel. In other words, missing red and blue pixel values can be estimated based at least in part on the interpolated green values. Assuming operation in the Bayer domain, a red value remains to be interpolated for each blue pixel and a blue value remains to be interpolated for each red pixel. Both red and blue values remain to be interpolated for green pixels.

As with green estimation above, red and blue values can be interpolated horizontally or vertically. Once you get the full resolution G image is obtained there are several alternative embodiments to interpolate R and B. For example, is there is a full G image and the original raw image is as follows:

| G G G | R G R |
|-------|-------|
| G G G | G B G |
| G G G | R G R |

The output OutB is the B in the center of the original raw image data. The output OutR is generated by calculating the average of (R-G) using the four pixels in the 3×3 corners and then adding the results to the value of the center G.

If there is a full G image and original raw image is as follows:

| G G G | G R G |
|-------|-------|
| G G G | B G B |
| G G G | G R G |

The output OutB is generated by calculating the average of (B-G) using the two pixels in the middle row in the 3×3 region and then adding the results to the center G.
Similarly, the output OutR is calculated by averaging (R-G) using the two pixels in the middle column in the 3×3 region and then adding the results to the center G. In one embodiment, a missing red value at a blue pixel (or a missing blue value at a red pixel) is interpolated in the same direction as the missing green value at the pixel. For example, if a missing green value for a red pixel was interpolated vertically (using the green pixel values of adjacent pixels above and below the red pixel), then the missing blue pixel value for that red pixel would also be interpolated vertically (using the blue pixel values of adjacent pixels above and below the red pixel).

After performing the red and blue interpolation, the full color image 408 is output. The output may be to a display (e.g., monitor, touch screen, etc.).

Figure 7:
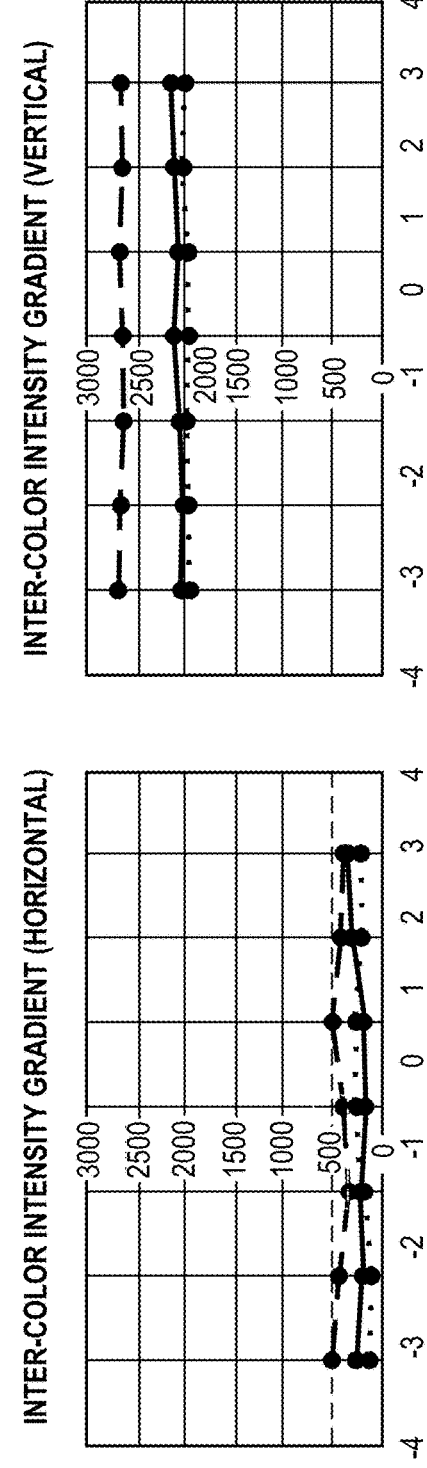
FIG. 7 illustrates gradient in Inter-Color Intensity Domain.

As shown in FIG. 7, the gradient in the horizontal direction is stably smaller than the vertical direction. Note that the use of this inter-color intensity gradient metric does not require input image data in a Bayer pattern. Thus, this metric may be applied to image data in a non-Bayer pattern.

As set forth above, one embodiment of a process is disclosed that includes receiving image data captured using an image sensor with a color filter array and performing a demosaicing operation on the image data, which includes selecting interpolated data based on an interpolation direction determined using color intensity gradient calculations that involve pixel values of the first color and at least one other color. In one embodiment, performing a demosaicing operation on the image data comprises generating missing green pixels from the image data generated by the color filtered array using interpolation data selected for blending based on the interpolation. Thus, demosaicing process reconstructs red, green, and blue pixels so that each location in an image region (e.g., each frame) has not only the originally captured pixel values output from a color filter array, but also two reconstructed pixel values.

Figure 8:
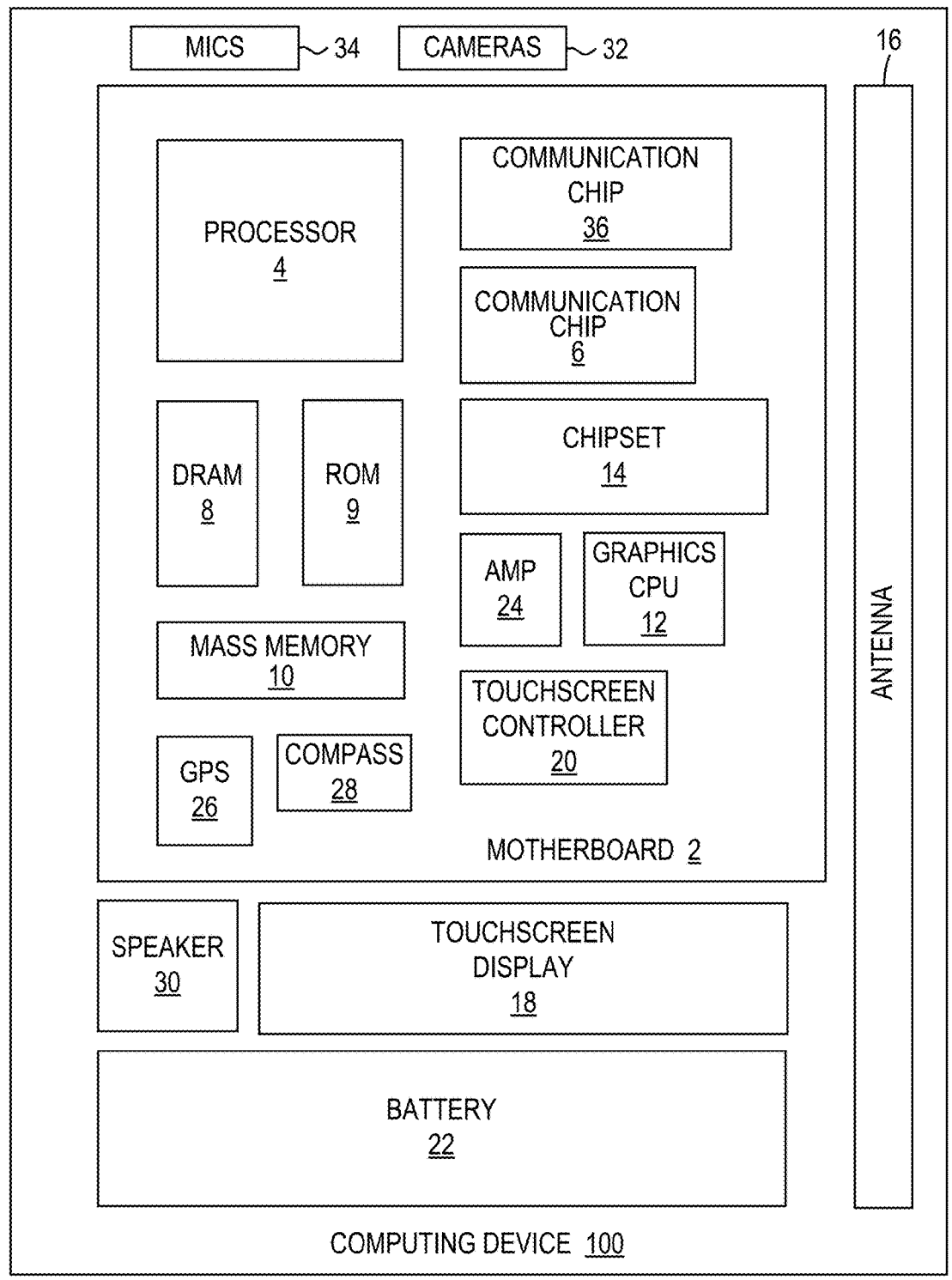
FIG. 8 is a block diagram of an image capture device.

FIG. 8 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

Cameras 32 may include all of the components of the camera or share resources, such as memory 8, 9, 10, processing 4 and user interface 12, 20, with other video device components and functions. The processor 4 is coupled to the camera and to memory to receive frames and produce enhanced images. In one embodiment, cameras 32 include an image capture sensor(s) and color filter array describe above. In one embodiment, cameras 32 also include an image processing system, as described above.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

In a first example embodiment, an apparatus comprises: a plurality of interpolation modules to perform a plurality of interpolation operations to generate color pixel values of a first color for a plurality of pixel locations in an image region that do not have color pixel values of the first color; a first module to generate a set of color pixel values of the first color for the image region, one or more color pixel values in the set of pixel values being generated based on color pixel values of the first color from one of the plurality of interpolation modules; and a second module to select the one interpolation module based on an interpolation direction determined by color intensity gradient calculations that involve pixel values of the first color and at least one other color.

In another example embodiment, the subject matter of the first example embodiment can optionally include that the first module is a blending module that blends pixel values from the one interpolation module selected by the second module with a second interpolation module of the plurality of interpolation modules.

In another example embodiment, the subject matter of the first example embodiment can optionally include that the plurality of interpolation modules comprise: a horizontal interpolation module to perform a horizontal interpolation operation by interpolating two pixel values at first adjacent locations to each location with a missing color pixel value in the image region, the first adjacent locations being left and right of the location with the missing color pixel value; a vertical interpolation module to perform a vertical interpolation operation by interpolating two pixel values at second adjacent locations to said each location with the missing color pixel value in the image region, the second adjacent locations being above and below of the location with the missing color pixel value; and a non-directional interpolation module to perform a non-directional interpolation operation to generate a pixel value for each of the missing color pixel values in the image region.

In another example embodiment, the subject matter of the first example embodiment can optionally include that the second module is operable to select either the horizontal interpolation module or the vertical module second module as the one interpolation module, and the blending module is operable to blend pixel values from the one interpolation module with pixels values from the non-directional interpolation module.

In another example embodiment, the subject matter of the first example embodiment can optionally include that the non-directional interpolation module to operable to perform an averaging operation to average a set of pixel values of the first color in the image region to produce said each missing color pixel value in the image region.

In another example embodiment, the subject matter of the first example embodiment can optionally include that the second module uses an inter-color intensity domain for the gradient calculations.

In another example embodiment, the subject matter of the first example embodiment can optionally include that the gradient calculations comprises a horizontal gradient score and a vertical gradient score, and further wherein the second module is to select the one interpolation module based on a comparison of the horizontal and vertical gradient scores.

In another example embodiment, the subject matter of the first example embodiment can optionally include that the pixel values of the image region are from an output of a color filter array.

In another example embodiment, the subject matter of the first example embodiment can optionally include that the color filter array is a Bayer color filter array.

In another example embodiment, the subject matter of the first example embodiment can optionally include a third module to generate missing color pixel values of a second color and a third color for the image region.

In a second example embodiment, a system comprises: an image capture unit having a color filter array and an image capture sensor; and an image processing unit comprising a demosaic module having a plurality of interpolation modules to perform a plurality of interpolation operations to generate color pixel values of a first color for a plurality of pixel locations in an image region that do not have color pixel values of the first color, a first module to generate a set of color pixel values of the first color for the image region, one or more color pixel values in the set of pixel values being generated based on color pixel values of the first color from one of the plurality of interpolation modules; and a second module to select the one interpolation module based on an interpolation direction determined by color intensity gradient calculations that involve pixel values of the first color and at least one other color.

In another example embodiment, the subject matter of the second example embodiment can optionally include that the first module is a blending module that blends pixel values from the one interpolation module selected by the second module with a second interpolation module of the plurality of interpolation modules.

In another example embodiment, the subject matter of the second example embodiment can optionally include that the plurality of interpolation modules comprise: a horizontal interpolation module to perform a horizontal interpolation operation by interpolating two pixel values at first adjacent locations to each location with a missing color pixel value in the image region, the first adjacent locations being left and right of the location with the missing color pixel value; a vertical interpolation module to perform a vertical interpolation operation by interpolating two pixel values at second adjacent locations to said each location with the missing color pixel value in the image region, the second adjacent locations being above and below of the location with the missing color pixel value; and a non-directional interpolation module to perform a non-directional interpolation operation to generate a pixel value for each of the missing color pixel values in the image region.

In another example embodiment, the subject matter of the second example embodiment can optionally include that the second module is operable to select either the horizontal interpolation module or the vertical module second module as the one interpolation module, and the blending module is operable to blend pixel values from the one interpolation module with pixels values from the non-directional interpolation module.

In another example embodiment, the subject matter of the second example embodiment can optionally include that the second module uses an inter-color intensity domain for gradient calculations.

In another example embodiment, the subject matter of the second example embodiment can optionally include that the gradient calculations comprises a horizontal gradient score and a vertical gradient score, and further wherein the second module is to select the one interpolation module based on a comparison of the horizontal and vertical gradient scores.

In another example embodiment, the subject matter of the second example embodiment can optionally include a third module to generate missing color pixel values of a second color and a third color for the image region.

In another example embodiment, the subject matter of the second example embodiment can optionally include that the color filter array comprises a Bayer color filter array.

In a third example embodiment, a method comprises receiving image data captured using an image sensor with a color filter array and performing a demosaicing operation on the image data, including selecting interpolated data based on an interpolation direction determined using color intensity gradient calculations that involve pixel values of the first color and at least one other color.

In another example embodiment, the subject matter of the third example embodiment can optionally include that performing a demosaicing operation on the image data comprises generating missing green pixels from the image data generated by the color filtered array using interpolation data selected for blending based on the interpolation direction.

In another example embodiment, the subject matter of the third example embodiment can optionally include that performing a demosaicing operation on the image data comprises using an inter-color intensity domain for the gradient calculations.

In another example embodiment, the subject matter of the third example embodiment can optionally include capturing the image data using an image sensor and the color filter array.

In a fourth example embodiment, an article of manufacture has one or more non-transitory computer readable media storing instructions which, when executed by a system, cause the system to perform a method comprising: receiving image data captured using an image sensor with a color filter array; and performing a demosaicing operation on the image data, including selecting interpolated data based on an interpolation direction determined using color intensity gradient calculations that involve pixel values of the first color and at least one other color.

In another example embodiment, the subject matter of the fourth example embodiment can optionally include that performing a demosaicing operation on the image data comprises generating missing green pixels from the image data generated by the color filtered array using interpolation data selected for blending based on the interpolation direction.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. An apparatus performing a demosaicing operation on image data comprising:
    a plurality of interpolation modules to perform a plurality of interpolation operations to generate color pixel values of a first color for a plurality of pixel locations in an image region that do not have color pixel values of the first color, wherein the plurality of interpolation modules comprises a horizontal interpolation module to perform a horizontal interpolation operation, a vertical interpolation module to perform a vertical interpolation operation, and a non-directional interpolation module to perform a non-directional interpolation operation;
    a first module to generate a set of color pixel values of the first color for the image region, one or more color pixel values in the set of pixel values being generated based on color pixel values of the first color from one of the plurality of interpolation modules;
    and a second module to select the one interpolation module based on an interpolation direction determined by color intensity gradient calculations that involve pixel values of the first color and at least one other color, wherein the second module is operable to select either the horizontal interpolation module or the vertical module as the one interpolation module, and wherein the first module is a blending module operable to blend pixel values from the one interpolation module with pixels values from the non-directional interpolation module.

2. The apparatus defined in claim 1 wherein the horizontal interpolation module is operable to perform the horizontal interpolation operation by interpolating two pixel values at first adjacent locations to each location with a missing color pixel value in the image region, the first adjacent locations being left and right of the location with the missing color pixel value;

wherein the vertical interpolation module is operable to perform the vertical interpolation operation by interpolating two pixel values at second adjacent locations to said each location with the missing color pixel value in the image region, the second adjacent locations being above and below of the location with the missing color pixel value; and wherein the non-directional interpolation module is operable to perform a non-directional interpolation operation to generate a pixel value for each of the missing color pixel values in the image region.

3. The apparatus defined in claim 1 wherein the non-directional interpolation module is operable to perform an averaging operation to average a set of pixel values of the first color in the image region to produce said each missing color pixel value in the image region.

4. The apparatus defined in claim 1 wherein the second module uses an inter-color intensity domain for the gradient calculations.

5. The apparatus defined in claim 1 wherein the gradient calculations comprises a horizontal gradient score and a vertical gradient score, and further wherein the second module is to select the one interpolation module based on a comparison of the horizontal and vertical gradient scores.

6. The apparatus defined in claim 1 wherein the pixel values of the image region are from an output of a color filter array.

7. The apparatus defined in claim 6 wherein the color filter array is a Bayer color filter array.

8. The apparatus defined in claim 1 further comprising a third module to generate missing color pixel values of a second color and a third color for the image region.

9. A system performing a demosaicing operation on image data comprising:
    an image capture unit having a color filter array and an image capture sensor; and an image processing unit comprising a demosaic module having
    a plurality of interpolation modules to perform a plurality of interpolation operations to generate color pixel values of a first color for a plurality of pixel locations in an image region that do not have color pixel values of the first color, wherein the plurality of interpolation modules comprises a horizontal interpolation module to perform a horizontal interpolation operation, a vertical interpolation module to perform a vertical interpolation operation, and a non-directional interpolation module to perform a non-directional interpolation operation,
    a first module to generate a set of color pixel values of the first color for the image region, one or more color pixel values in the set of pixel values being generated based on color pixel values of the first color from one of the plurality of interpolation modules; and
    a second module to select the one interpolation module based on an interpolation direction determined by color intensity gradient calculations that involve pixel values of the first color and at least one other color, wherein the second module is operable to select either the horizontal interpolation module or the vertical interpolation module as the one interpolation module, and wherein the first module is a blending module operable to blend pixel values from the one interpolation module with pixels values from the non-directional interpolation module.

10. The system defined in claim 9 wherein the horizontal interpolation module is operable to perform the horizontal interpolation operation by interpolating two pixel values at first adjacent locations to each location with a missing color pixel value in the image region, the first adjacent locations being left and right of the location with the missing color pixel value;
- wherein the a vertical interpolation module is operable to perform the vertical interpolation operation by interpolating two pixel values at second adjacent locations to said each location with the missing color pixel value in the image region, the second adjacent locations being above and below of the location with the missing color pixel value; and
- wherein the non-directional interpolation module is operable to perform a non-directional interpolation operation to generate a pixel value for each of the missing color pixel values in the image region.

11. The system defined in claim 9 wherein the second module uses an inter-color intensity domain for gradient calculations.

12. The system defined in claim 9 wherein the gradient calculations comprises a horizontal gradient score and a vertical gradient score, and further wherein the second module is to select the one interpolation module based on a comparison of the horizontal and vertical gradient scores.

13. The system defined in claim 9 further comprising a third module to generate missing color pixel values of a second color and a third color for the image region.

14. The system defined in claim 9 wherein the color filter array comprises a Bayer color filter array.

15. A method comprising:
- receiving image data captured using an image sensor with a color filter array; and
- performing a demosaicing operation on the image data, including selecting interpolated data based on an interpolation direction determined using color intensity gradient calculations that involve pixel values of a first color and at least one other color, including blending pixel values from either a horizontal interpolation module or a vertical interpolation module, based on the interpolation direction, with pixels values from a non-directional interpolation module.

16. The method defined in claim 15 wherein performing the demosaicing operation on the image data comprises generating missing green pixels from the image data generated by the color filtered array using interpolation data selected for blending based on the interpolation direction.

17. The method defined in claim 15 wherein performing the demosaicing operation on the image data comprises using an inter-color intensity domain for the gradient calculations.

18. The method defined in claim 15 further comprising: capturing the image data using the image sensor and the color filter array.

19. An article of manufacture having one or more non-transitory computer readable media storing instructions which, when executed by a system having a touch screen surface with a plurality of transmitters and a plurality of receivers, cause the system to perform a method comprising:
- receiving image data captured using an image sensor with a color filter array; and
- performing a demosaicing operation on the image data, including selecting interpolated data based on an interpolation direction determined using color intensity gradient calculations that involve pixel values of a first color and at least one other color, including blending pixel values from either a horizontal interpolation module or a vertical interpolation module, based on the interpolation direction, with pixels values from a non-directional interpolation module.

20. The article of manufacture defined in claim 19 wherein performing the demosaicing operation on the image data comprises generating missing green pixels from the image data generated by the color filtered array using interpolation data selected for blending based on the interpolation direction.

* * * * *